(12) United States Patent
Andreasson et al.

(10) Patent No.: US 6,805,849 B1
(45) Date of Patent: Oct. 19, 2004

(54) SYSTEM FOR $NO_x$ REDUCTION IN EXHAUST GASES

(75) Inventors: Anders Andreasson, Frolunda (SE); Guy Richard Chandler, Little Eversden (GB); Claus Friedrich Goersmann, Cambridge (GB); James Patrick Warren, Cambridge (GB)

(73) Assignees: Johnson Matthey Public Limited Company, London (GB); HJS Fahrzeugtechnik GmbH & Co. KG, Menden (DE)

( * ) Notice: Subject to any disclaimer, the term of this patent is extended or adjusted under 35 U.S.C. 154(b) by 0 days.

(21) Appl. No.: 09/601,694

(22) PCT Filed: Jan. 28, 1999

(86) PCT No.: PCT/GB99/00292

§ 371 (c)(1),
(2), (4) Date: Jan. 9, 2001

(87) PCT Pub. No.: WO99/39809

PCT Pub. Date: Aug. 12, 1999

(30) Foreign Application Priority Data

Feb. 6, 1998 (GB) .............................................. 9802504

(51) Int. Cl.⁷ ................................................ C01B 21/00
(52) U.S. Cl. .................................... 423/239.1; 422/172
(58) Field of Search ................................ 422/171, 172, 422/177, 180; 60/274; 423/213.2, 213.5, 239.1, 400

(56) References Cited

U.S. PATENT DOCUMENTS

| | | | |
|---|---|---|---|
| 4,912,776 A | * 3/1990 | Alcorn .................... | 423/239.1 |
| 4,919,905 A | 4/1990 | Horaguchi et al. | |
| 5,224,334 A | * 7/1993 | Bell ............................ | 60/274 |
| 5,534,237 A | * 7/1996 | Yoshida et al. .......... | 423/239.1 |
| 5,670,443 A | * 9/1997 | Irite et al. .................... | 502/330 |
| 6,274,107 B1 | * 8/2001 | Yavuz et al. ............. | 423/213.5 |
| 6,294,141 B1 | * 9/2001 | Twigg et al. ............ | 423/213.7 |

FOREIGN PATENT DOCUMENTS

| | | | |
|---|---|---|---|
| DE | 40 32 085 | 4/1992 | |
| DE | 40 32 085 A1 | 4/1992 | |
| DE | 196 18 397 A1 | 11/1997 | |
| EP | 0 283 913 | 9/1988 | |
| EP | 0 341 832 | 11/1989 | |
| EP | 0 628 706 A2 | 12/1994 | |
| EP | 0 758 713 | 2/1997 | |
| EP | 0 806 553 A2 | 11/1997 | |
| JP | 8103636 | 4/1996 | |
| JP | 8-281061 | 10/1996 | |
| JP | 8338320 | 12/1996 | |
| JP | 9206559 | 8/1997 | |
| WO | WO 9743528 A1 | * 11/1997 | ............. F01N/3/28 |

OTHER PUBLICATIONS

R. H. Hammerle; D. Ketcher; R. W. Horrocks; G. Lepperhoff; G. Hüthwohl; and B Lüers, "Emissions from Diesel Vehicles with and without Lean NOx and Oxidation Catalysts and Particulate Traps," SAE Technical Paper Series, Paper No. 952391, Copyright 1995 Society of Automotive Engineers, Inc., pp. 197–215, no month.

Memorandum from HJS Fahrzeugtechnik GmbH & Co. dated Aug. 30, 1996, regarding visit to PESAG, Paderborn, Aug. 28, 1996.

Letter from HJS Fahrzeugtechnik GmbH & Co. to Siemens AG dated Jan. 7, 1997.

Letter from HJS Fahrzeugtechnik GmbH & Co. to SKW Stickstoffwerke Piesteritz GmbH dated Feb. 12, 1997.

Memorandum from HJS Fahrzeugtechnik GmbH & Co. dated Jun. 23, 1997, regarding SCR—Project discussion with the VDV on Jul. 23, 1997.

Meeting minutes of a discussion on Jul. 21, 1997, and an associated Annex.

Letter (grant application) from Leipziger Verkehrsbetriebe (LVB) GmbH to Sachen State Ministry for Economics and Employment, Transport Department, dated Oct. 1, 1997, and Annex entitled "Project description 'Low–pollution bus drives'.".

Dr.–Ing. Georg Hüthwohl, Dr. Bernd Maurer, and Dipl.–Ing. H. Th. Vogel, Menden, "Emissionen von Dieselmotoren," *Der Nahverkehr*, 7–8, 97, pp. 22–27, no date.

P. Rodenbuesch, "<<CRT>> und <<SINOx>> zur Senkung von Lastwagenabgasen," *Autotechnik*, 45 (1996), p. 17.

Paul Zelenka, Wolfgang Cartellieri, and Peter Herzog, "Worldwide diesel emission standards, current experiences and future needs," *Applied Catalysis B: Environmental*, vol. 10, 1996, pp. 3–28, no month.

Jan G. M. Brandin, Lars A. H. Andersson, and C. U. Ingemar Odenbrand, "Catalytic Reduction of Nitrogen Oxides on Mordenite: Some Aspect on the Mechanism," *Catalysis Today*, vol. 4 (1989), pp. 187–203, no month.

P. Hawker; N. Myers; G. Hüthwohl; H. Th. Vogel; B. Bates; L. Magnusson; and P. Bronnenberg, "Experience with a New Particulate Trap Technology in Europe," SAE Paper No. 970182, Copyright 1997 Society of Automotive Engineers, Inc., no month.

(List continued on next page.)

*Primary Examiner*—Stanley S. Silverman
*Assistant Examiner*—Edward M. Johnson
(74) *Attorney, Agent, or Firm*—RatnerPrestia

(57) ABSTRACT

Selective catalytic reduction of $NO_x$ in combustion gases, especially from diesel engines, utilizes a system incorporating an oxidation catalyst to convert at least a portion of NO to $NO_2$, a particulate filter downstream of the oxidation catalyst, a source of reductant such as $NH_3$ or urea for injection downstream of the particulate filter, and an SCR catalyst located downstream of the point of injection of the reductant. Considerable improvements in $NO_x$ conversion are observed.

9 Claims, 4 Drawing Sheets

OTHER PUBLICATIONS

Figure 1:
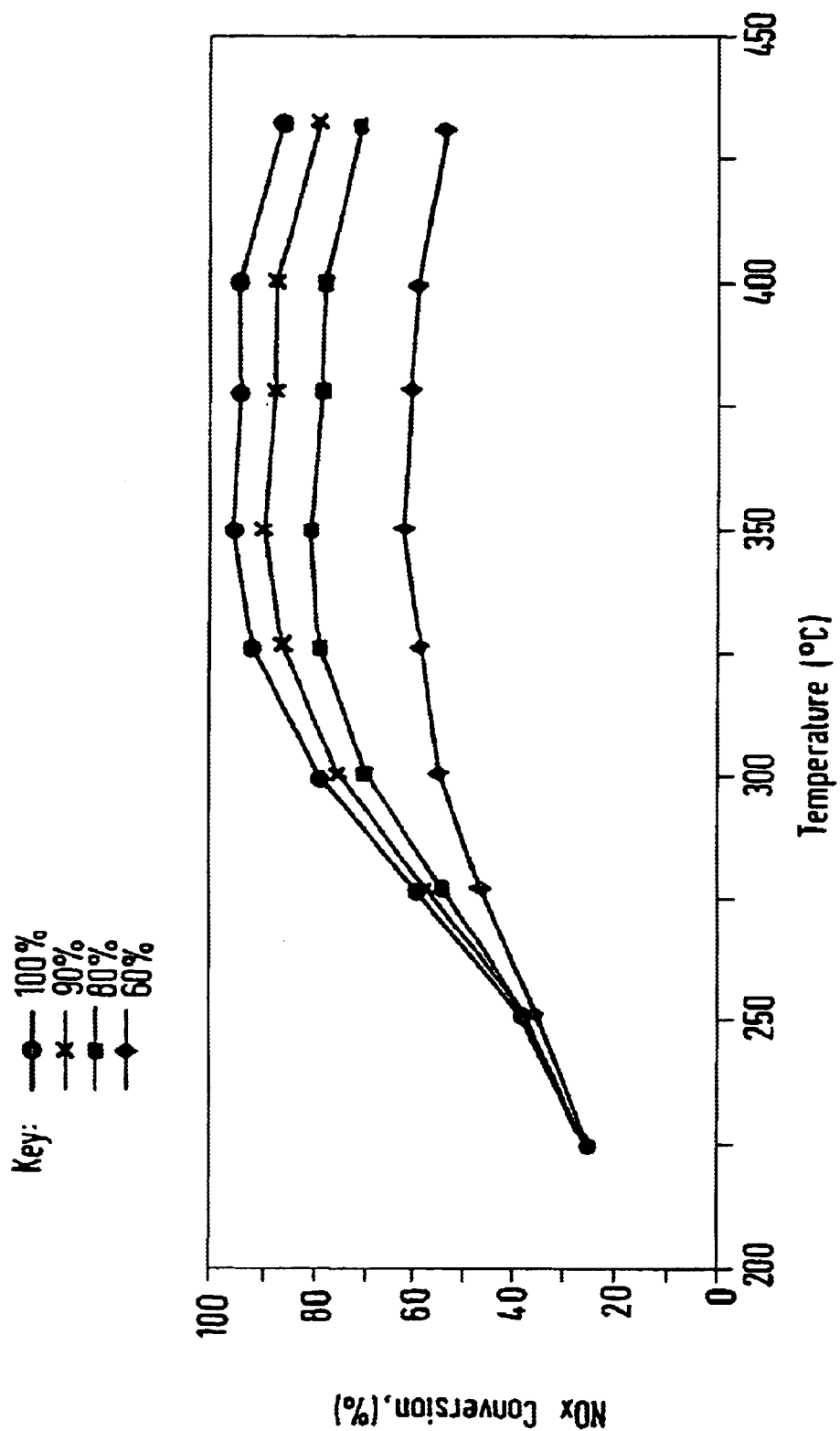

Letter from Saxony State Ministry for Commerce and Employment to Leipzig Verkehrsbetriebe (LVB) GmbH, dated Dec. 5, 1997.

E. J. Janssen, "Environmental Catalysis—Stationary Sources," *Handbook of Heterogeneous Catalysis*, G. Ertl, H. Knözinger, and J. Weitkamp (editors), © VCH Verlagsgesellachaft mbH, D–69451 Weinheim (Federal Republic of Germany), 1997, pp. 1633–1644, no month.

British Patent Office Search Report of priority application No. 9802504.2 dated Jun. 8, 1998.

International Search Report of PCT/GB99/00292 dated May 21, 1999.

* cited by examiner

SYSTEM FOR $NO_x$ REDUCTION IN EXHAUST GASES

This application is the U.S. national phase application of International Application No. PCT/GB99/00292 filed Jan. 28, 1999.

The present invention concerns improvements in selective catalytic reduction of NOx in waste gas streams such as diesel engine exhaust or other lean exhaust gases such as from gasoline direct injection (GDI).

EP 0 758 713 (Toyota) describes a method for purifying the exhaust gas of a diesel engine which uses a catalyst to convert NO in the exhaust gas to $NO_2$, there after trapping particulate in a filter and oxidising the particulate by reaction with the $NO_2$. The exhaust gas is thereafter fed to a $NO_x$ absorbent or, in one embodiment, to a $NO_x$ conversion catalyst. Unburnt hydrocarbons and CO in the exhaust gas are trapped in a zeolite and released to react with $NO_x$ on the $NO_x$ conversion catalyst.

The technique named SCR (Selective Catalytic Reduction) is well established for industrial plant combustion gases, and may be broadly described as passing a hot exhaust gas over a catalyst in the presence of a nitrogenous reductant, especially ammonia or urea. This is effective to reduce the NOx content of the exhaust gases by about 20–25% at about 250° C., or possibly rather higher using platinum catalyst, although platinum catalysts tend to oxidise $NH_3$ to NOx during higher temperature operation. We believe that SCR systems have been proposed for NOx reduction for vehicle engine exhausts, especially large or heavy duty diesel engines, but this does require on-board storage of such reductants, and is not believed to have met with commercial acceptability at this time.

We believe that if there could be a significant improvement in performance of SCR systems, they would find wider usage and may be introduced into vehicular applications. It is an aim of the present invention to improve significantly the conversion of NOx in a SCR system, and to improve the control of other pollutants using a SCR system.

Accordingly, the present invention provides an improved SCR catalyst system for treating combustion exhaust gas containing NO and particulates, comprising in combination and in order, an oxidation catalyst effective to convert NO to $NO_2$ and enhance $NO_2$ content of the exhaust gas, a particulate filter, a source of reductant fluid, injection means for said reductant fluid located downstream of said particulate trap and an SCR catalyst.

The invention further provides an improved method of reducing pollutants, including particulates and NOx in gas streams, comprising passing such gas stream over an oxidation catalyst under conditions effective to convert at least a portion of NO in the gas stream to $NO_2$, and enchance the $NO_2$ content of the gas stream, removing at least a portion of said particulates in a particulate trap, reacting trapped particulate with $NO_2$, adding reductant fluid to the gas stream to form a gas mixture downstream of said trap, and passing the gas mixture over an SCR catalyst.

Although the present invention provides, at least in its preferred embodiments, the opportunity to reduce very significantly the $NO_x$ emissions from the lean (high in oxygen) exhaust gases from diesel and similar engines, it is to be noted that the invention also permits very good reductions in the levels of other regulated pollutants, especially hydrocarbons and particulates.

The invention is believed to have particular application to the exhausts from heavy duty diesel engines, especially vehicle engines, eg truck or bus engines, but is not to be regarded as being limited thereto. Other applications might be LDD (light duty diesel), GDI, CNG (compressed natural gas) engines, ships or stationary sources. For simplicity, however, the majority of this description concerns such vehicle engines.

We have surprisingly found that a "pre-oxidising" step, which is not generally considered necessary of the low content of CO and unburnt fuel in diesel exhausts, is particularly effective in increasing the conversion of NOx to $N_2$ by the SCR system. We also believe that minimising the levels of hydrocarbons in the gases may assist in the conversion of NO to $NO_2$. This may be achieved catalytically and/or by engine design or management. Desirably, the $NO_2$/NO ratio is adjusted according to the present invention to the most beneficial such ratio for the particular SCR catalyst and CO and hydrocarbons are oxidized prior to the SCR catalyst. Thus, our preliminary results indicate hat for a transition metal/zeolite SCR catalyst it is desirable to convert all NO to $NO_2$, whereas for a rare earth-based SCR catalyst, a high ratio is desirable providing there is some NO, and for other transition metal-based catalysts gas mixtures are notably better than either substantially only NO or $NO_2$. Even more surprisingly, the incorporation of a particulate filter permits still higher conversions of NOx.

The oxidation catalyst may be any suitable catalyst, and is generally available to those skilled in art. For example, a Pt catalyst deposited upon a ceramic or metal through-flow honeycomb support is particularly suitable. Suitable catalysts are e.g. Pt/Al2O3 catalysts, containing 1–150 g Pt/ft$^3$ (0.035–5.3 g Pt/liter catalyst volume dependingbon the NO2/NO ratio require. Such catalysts may contain other components providing there is a beneficial effect or at least no significant adverse effect.

The source of reductant fluid conveniently uses existing technology to inject fluid into the gas stream. For example, in the tests for the present invention, a mass controller was used to control supply of compressed $NH_3$, which was injected through an annular injector ring mounted in the exhaust pipe. The injector ring had a plurality of injection ports arranged around its periphery. A conventional diesel fuel injection system including pump and injector nozzle has been used to inject urea by the present applicants. A stream of compressed air was also injected around the nozzle; this provided good mixing and cooling.

The reductant fluid is suitably $NH_3$, but other reductant fluids including urea, ammonium carbamate and hydrocarbons including diesel fuel may also be considered. Diesel fuel is, of course, carried on board a diesel-powered vehicle, but diesel fuel itself is a less selective reductant than $NH_3$ and is presently not preferred.

Suitable SCR catalysts are available in the art and include Cu-based and vanadia-based catalysts. A preferred catalyst at present is a $V_2O_5/WO_3/TiO_2$ catalyst, supported on a honeycomb through-flow support. Although such a catalyst has shown good performance in the tests described hereafter and is commercially available, we have found that sustained high temperature operation can cause catalyst deactivation. Heavy duty diesel engines, which are almost exclusively charged, can produce exhaust gases at greater than 500° C. under conditions of high load and/or high speed, and such temperatures are sufficient to cause catalyst deactivation. In one embodiment of the invention, therefore, cooling means is provided upstream of the SCR catalyst. Cooling means may suitably be activated by sensing high catalyst temperatures or by other, less direct, means, such as determining conditions likely to lead to high catalyst temperatures. Suitable cooling means include water injection upstream of the SCR catalyst, or air injection, for example utilising the engine turbocharger to provide a stream of fresh intake air by-passing the engine. We have observed a loss of activity of the catalyst, however, using water injection, and air injection by modifying the turbocharger leads to higher space velocity over the catalyst which tends to reduce NOx conversion. Preferably, the preferred SCR catalyst is maintained at a temperature from 160° C. to 450° C.

We believe that in its presently preferred embodiments, the present invention may depend upon an incomplete conversion of NO to $NO_2$. Desirably, therefore, the oxidation catalyst, or the oxidation catalyst together with the particulate trap if used, yields a gas stream entering the SCR catalyst having a ratio of NO to $NO_2$ of from about 4:1 to about 1:3 by vol, for the commercial vanadia-type catalyst. As mentioned above, other SCR catalysts perform better with different $NO/NO_2$ ratios. We do not believe that it has previously been suggested to adjust the $NO/NO_2$ ratio in order to improve NOx reduction.

The present invention incorporates a particulate trap downstream of the oxidation catalyst. We discovered that soot-type particulates may be removed from a particulate trap by "combustion" at relatively low temperatures in the presence of $NO_2$. In effect, the incorporation of such a particulate trap serves to clean the exhaust gas of particulates without causing accumulation, with resultant blockage or back-pressure problems, whilst simultaneously reducing a proportion of the NOx. Suitable particulate traps are generally available, and arm desirably of the type known as wall-flow filters, generally manufactured from a ceramic, but other designs of particulate trap, including woven, knitted or non-woven heat-resistant fabrics, may be used.

It may be desirable to incorporate a clean-up catalyst downstream of the SCR catalyst, to remove any $NH_3$ or derivatives thereof which could pass through unreacted or as by-products. Suitable clean-up catalysts are available to the skilled person.

A particularly interesting possibility arising from the present invention has especial application to light duty diesel engines (car and utility vehicles) and permits a significant reduction in volume and weight of the exhaust gas aftertreatment system, in a suitable engineered system.

Several tests have been carried out in making the present invention. These are described below, and are supported by results shown in graphical form in the attached drawings.

A commercial 10 liter turbocharged heavy duty diesel engine on a test-bed was used for all the tests described herein.

Test 1—(Comparative)

A conventional SCR system using a commercial $V_2O_5/WO_3/TiO_2$ catalyst, was adapted and fitted to the exhaust system of the engine. $NH_3$ was injected upstream of the SCR catalyst at varying ratios. The $NH_3$ was supplied from a cylinder of compressed gas and a conventional mass flow controller used to control the flow of $NH_3$ gas to an experimental injection ring. The injection ring was a 10 cm diameter annular ring provided with 20 small injection ports arranged to inject gas in the direction of the exhaust gas flow. NOx conversions were determined by fitting a NOx analyser before and after the SCR catalyst and are plotted against exhaust gas temperature in FIG. 1. Temperatures were altered by maintaining the engine speed constant and altering the torque applied.

A number of tests were run at different quantities of $NH_3$ injection, from 60% to 100% of theoretical, calculated at 1:1 $NH_3$/NO and 4:3 $NH_3$/NO2. It can readily be seen that at low temperatures, corresponding to light load, conversions are about 25%, and the highest conversions require stoichiometric (100%) addition of $NH_3$ at catalyst temperatures of from 325 to 400° C., and reach about 90%. However, we have determined that at greater than about 70% of stoichiometric $NH_3$ injection, $NH_3$ slips through the SCR catalyst unreacted, and can cause further pollution problems.

Test 2 (Comparative)

Figure 2:
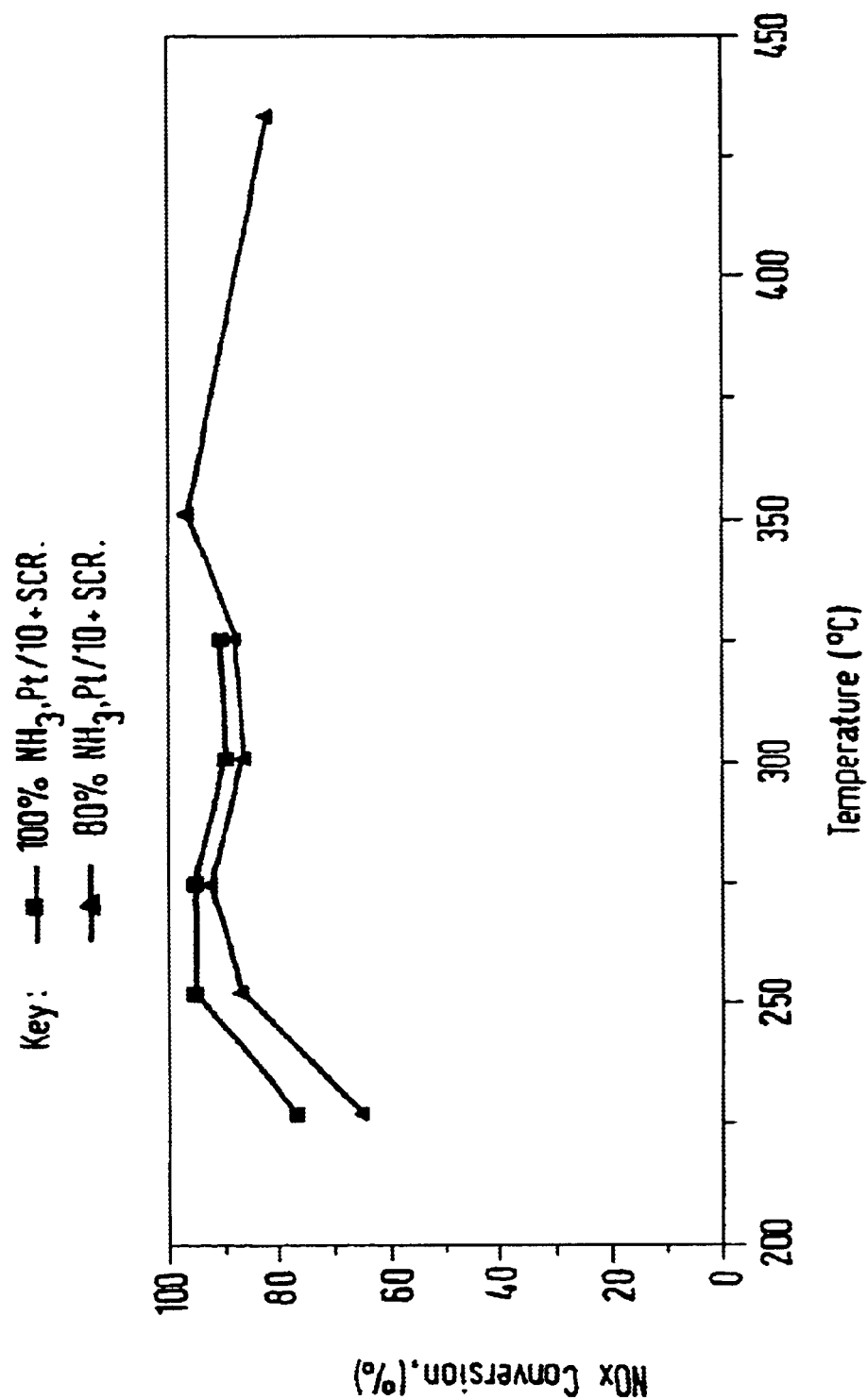

The test rig was modified by inserting into the exhaust pipe upstream of the $NH_3$ injection, a commercial platinum oxidation catalyst of 10.5 inch diameter and 6 inch length (26.67 cm diameter and 15.24 cm length) containing 10 g $Pt/ft^3$ (=0.35 g/liter) of catalyst volume. Identical tests were run, and it was observed from the results plotted in FIG. 2, that even at 225° C., the conversion of NOx has increased from 25% to >60%. The greatest conversions were in excess of 95%. No slippage of $NH_3$ was observed in this test nor in the following test.

Test 3

Figure 3:
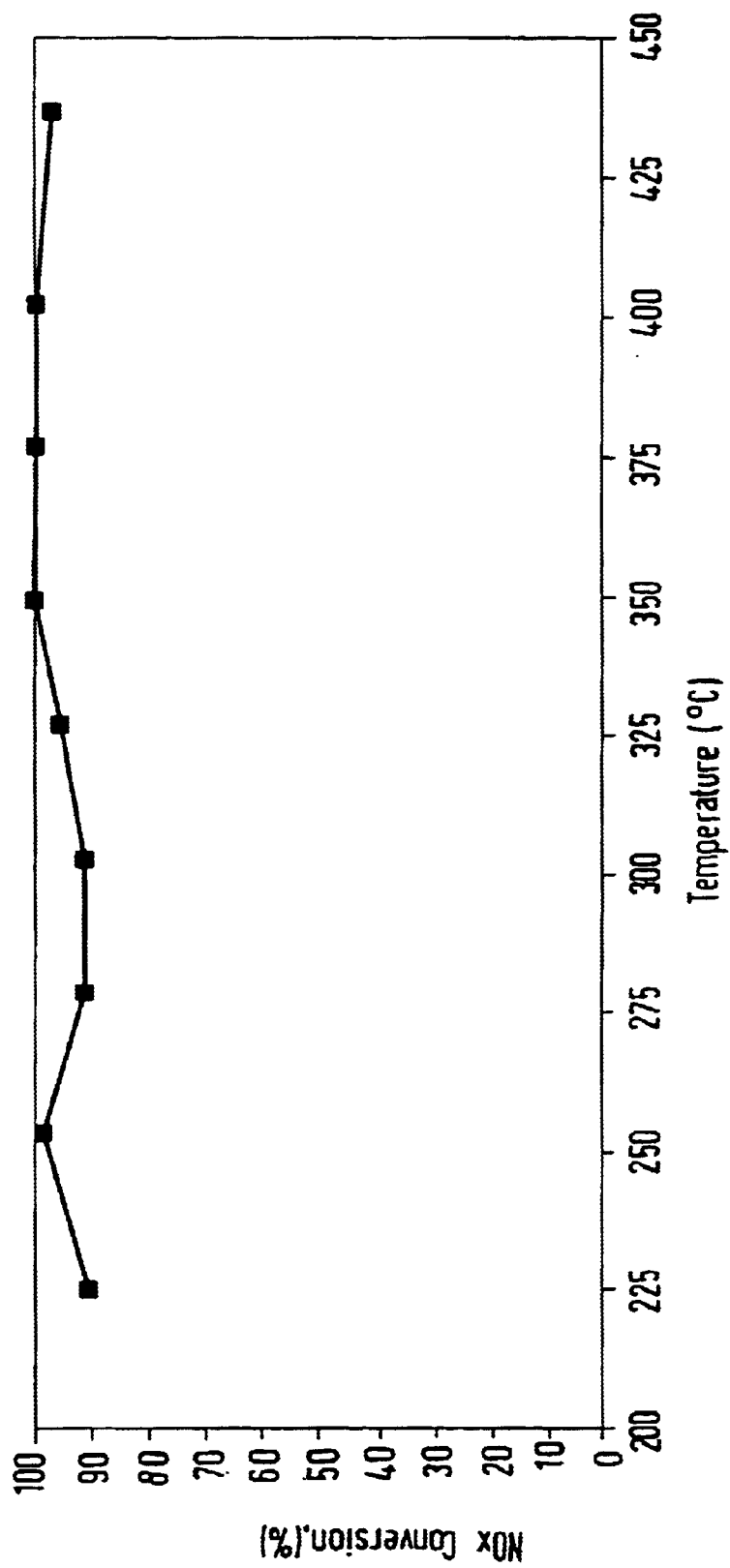

The test rig was modified further, by inserting a particulate trap before the $NH_3$ injection point, and the tests run again under the same conditions at 100% $NH_3$ injection and a space velocity in the range 40,000 to 70,000 $hr^{-1}$ over the SCR catalyst. The results are plotted and shown in FIG. 3. Surprisingly, there is a dramatic improvement in NOx conversion, to above 90% at 225° C., and reaching 100% at 350° C. Additionally, of course, the particles which are the most visible pollutant from diesel engines, are also controlled.

Test 4

Figure 4:
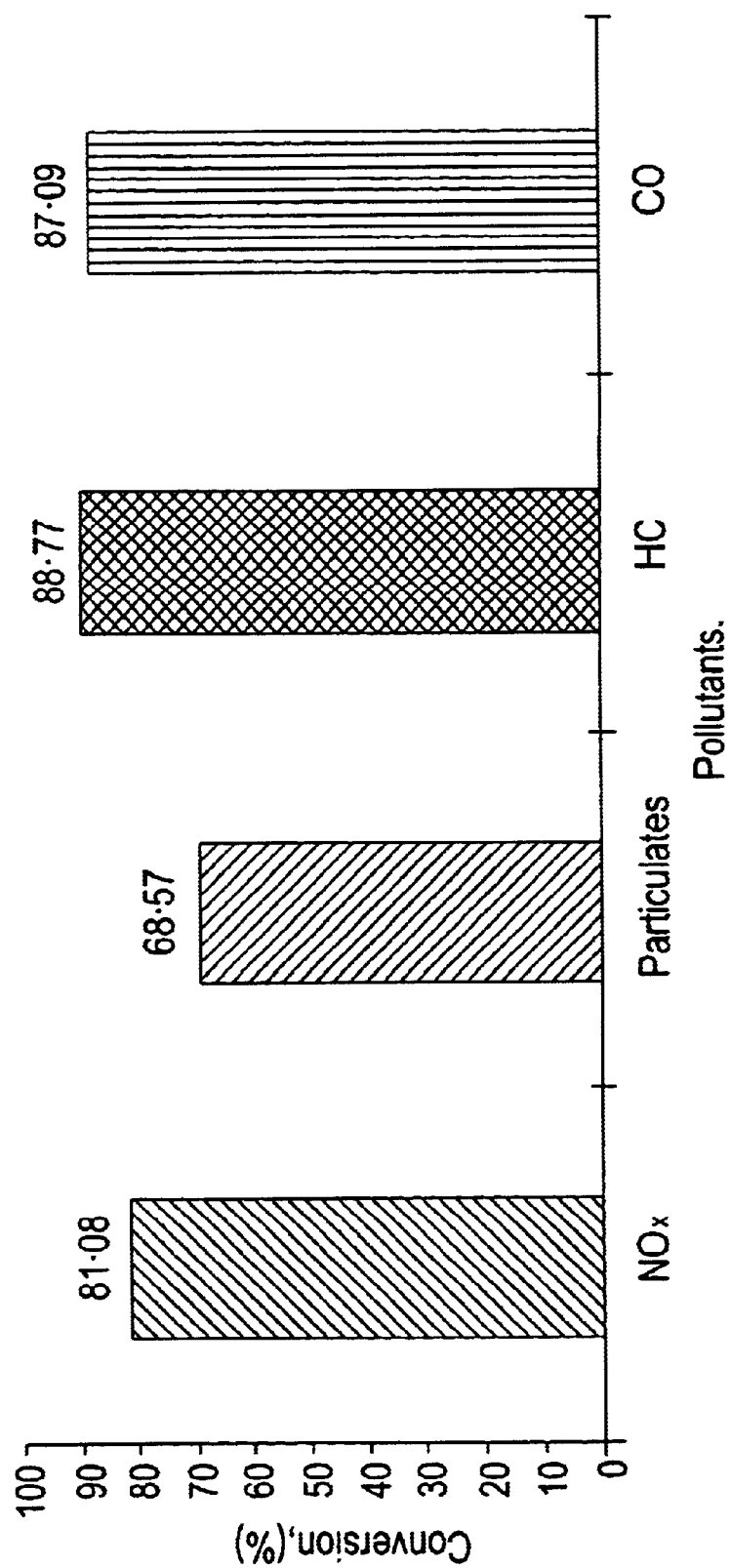

An R49 test with 80% $NH_3$ injection was carried out over a $V_2O_5/WO_3/TiO_2$ SCR catalyst. This gave 67% particulate, 89% HC and 87% NOx conversion; the results are plotted in FIG. 4.

Additionally test have been carried out with a different diesel engine, and the excellent results illustrated in Test 3 and 4 above have beat confirmed.

The results have been confirmed also for a non-vanadium SCR catalyst.

What is claimed is:

1. An SCR system for treating combustion exhaust gas containing $NO_x$ and particulates, comprising an oxidation catalyst effective to convert at least a portion of NO in said $NO_x$ to $NO_2$ thereby enhancing $NO_2$ content of the exhaust gas, a particulate trap, wherein said particulate trap is located downstream of said oxidation catalyst, a source of reductant fluid, wherein said reductant fluid is $NH_3$ or urea, an injection means for said reductant fluid located downstream of said particulate trap and an SCR catalyst, wherein said SCR catalyst is located downstream of said injection means and wherein the SCR catalyst comprises a $V_2O_5/WO_3/TiO_2$ catalyst, supported on a through-flow honeycomb support.

2. An SCR system according to claim 1, wherein the reductant fluid is $NH_3$.

3. An SCR system according to claim 1, wherein the oxidation catalyst is a platinum catalyst carried on a through-flow honeycomb support.

4. An SCR system according to claim 1, wherein the particulate filter is a wall-flow filter.

5. An SCR system according to claim 1, further comprising means to cool gases upstream of the SCR catalyst.

6. An SCR system according to claim 5, further comprising control means such that said means to cool gases is activated only when a high SCR catalyst temperature is detected or conditions are determined that are expected to lead to high catalyst temperatures.

7. An SCR system according to claim 1, wherein the reductant fluid is urea.

8. A diesel engine provided with an SCR system for treating combustion exhaust gas containing $NO_x$ and particulates, said SCR system comprising an oxidation catalyst effective to convert at least a portion of NO in said $NO_x$ to $NO_2$ thereby enhancing $NO_2$ content of the exhaust gas, a particulate trap, wherein said particulate trap is located downstream of said oxidation catalyst, a source of reductant fluid, wherein said reductant fluid is $NH_3$ or urea, an injection means for said reductant fluid located downstream of said particulate trap and an SCR catalyst, wherein said SCR catalyst is located downstream of said injection means, and wherein the SCR catalyst comprises a $V_2O_5/WO_3/TiO_2$ catalyst, supported on a through-flow honeycomb support.

9. A diesel engine according to claim 8, wherein the volume of the SCR system is reduced and the diesel engine is light duty.

* * * * *

INTER PARTES REEXAMINATION CERTIFICATE (1003rd)

United States Patent
Andreasson et al.

(10) Number: US 6,805,849 C1
(45) Certificate Issued: Dec. 2, 2014

(54) SYSTEM FOR $NO_x$ REDUCTION IN EXHAUST GASES

(75) Inventors: Anders Andreasson, Frolunda (SE); Guy Richard Chandler, Little Eversden (GB); Claus Friedrich Goersmann, Cambridge (GB); James Patrick Warren, Cambridge (GB)

(73) Assignees: Daimler AG, Stuttgart (DE); HJS Fahrzeugtechnik GmbH & Co KG, Menden (DE); Johnson Matthey Public Limited Company, London (GB)

Reexamination Request:
No. 95/002,211, Sep. 13, 2012

Reexamination Certificate for:
Patent No.: 6,805,849
Issued: Oct. 19, 2004
Appl. No.: 09/601,694
Filed: Jan. 9, 2001

(21) Appl. No.: 95/002,211

(22) PCT Filed: Jan. 28, 1999

(86) PCT No.: PCT/GB99/00292
§ 371 (c)(1), (2), (4) Date: Jan. 9, 2001

(87) PCT Pub. No.: WO99/39809
PCT Pub. Date: Aug. 12, 1999

(30) Foreign Application Priority Data

Feb. 6, 1998 (GB) .................................. 9802504

(51) Int. Cl.
*B01D 53/94* (2006.01)
*F01N 3/20* (2006.01)
*F01N 3/28* (2006.01)
*F01N 3/023* (2006.01)
*F01N 3/32* (2006.01)
*F01N 7/02* (2006.01)
*F01N 3/30* (2006.01)

(52) U.S. Cl.
USPC ........................................ 423/239.1; 422/172

(58) Field of Classification Search
None
See application file for complete search history.

(56) References Cited

To view the complete listing of prior art documents cited during the proceeding for Reexamination Control Number 95/002,211, please refer to the USPTO's public Patent Application Information Retrieval (PAIR) system under the Display References tab.

*Primary Examiner* — Krisanne Jastrzab

(57) ABSTRACT

Selective catalytic reduction of $NO_x$ in combustion gases, especially from diesel engines, utilizes a system incorporating an oxidation catalyst to convert at least a portion of NO to $NO_2$, a particulate filter downstream of the oxidation catalyst, a source of reductant such as $NH_3$ or urea for injection downstream of the particulate filter, and an SCR catalyst located downstream of the point of injection of the reductant. Considerable improvements in $NO_x$ conversion are observed.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-9 are cancelled.

* * * * *